US007607212B2

United States Patent
Nakamura

(10) Patent No.: US 7,607,212 B2
(45) Date of Patent: Oct. 27, 2009

(54) LOCATING UNIT FOR WORK HAVING A LOCATING BORE AND AN EMBOSSED PORTION FORMED ABOUT THE LOCATING BORE

(75) Inventor: Setsuo Nakamura, Kanagawa-ken (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 166 days.

(21) Appl. No.: 11/202,200

(22) Filed: Aug. 12, 2005

(65) Prior Publication Data

US 2005/0269852 A1   Dec. 8, 2005

Related U.S. Application Data

(62) Division of application No. 10/014,549, filed on Dec. 14, 2001, now Pat. No. 6,944,927.

(30) Foreign Application Priority Data

Jan. 31, 2001   (JP) .............................. 2001-022854

(51) Int. Cl.
*B23Q 7/00* (2006.01)
*B23Q 17/00* (2006.01)
(52) U.S. Cl. ......................... 29/559; 29/721; 29/281.1; 29/407.1; 29/464; 269/54.5
(58) Field of Classification Search .............. 29/407.1, 29/464, 559, 721, 281.1, 271; 269/54.5
See application file for complete search history.

(56) References Cited

U.S. PATENT DOCUMENTS

| 3,906,607 | A | * | 9/1975 | Gusev | 29/281.5 |
| 3,918,694 | A | * | 11/1975 | Laudick | 269/47 |
| 4,429,862 | A | * | 2/1984 | Niedecker | 269/47 |
| 4,500,079 | A | * | 2/1985 | Morghen | 269/47 |
| 4,601,110 | A | * | 7/1986 | Donaldson | 33/547 |

(Continued)

FOREIGN PATENT DOCUMENTS

DE   100 02 481 A1   8/2001

(Continued)

OTHER PUBLICATIONS

Patent Abstracts of Japan, vol. 1998, No. 14, Dec. 31, 1998, JP 10-249536 (Sep. 22, 1998).

*Primary Examiner*—Essama Omgba
(74) *Attorney, Agent, or Firm*—Foley & Lardner LLP

(57) ABSTRACT

A machine and a method for assembling a vehicle body is disclosed as including a locating pin (26) formed with a seating flange portion (35) having a work seating surface (35a) and a clamp arm (39) contained in the locating pin to be operable in a clamping or unclamping movement responsive to an extrusion and retraction of a clamp cylinder (34). A detection pin (47) is mounted for an extruding and extracting movement from the work seating surface (35a), with the detection pin (47), a shaft (44) ad a proximity switch (48) forming a work seating detection mechanism (49). A mutual engagement between the locating pin (26) and a locating bore (R) allows a panel W3 to be positioned, simultaneously detecting the presence of seating of the panel W3 responsive to a movement of the detection pin (47).

8 Claims, 10 Drawing Sheets

U.S. PATENT DOCUMENTS

| | | | |
|---|---|---|---|
| 4,700,488 A * | 10/1987 | Curti | 33/613 |
| 4,734,979 A | 4/1988 | Sakamoto et al. | |
| 4,741,523 A * | 5/1988 | Sato et al. | 269/316 |
| 5,014,405 A | 5/1991 | Yamana et al. | |
| 5,722,648 A * | 3/1998 | Groll et al. | 269/47 |
| 5,970,621 A | 10/1999 | Bazydola et al. | |
| 6,102,383 A * | 8/2000 | Tunkers | 269/24 |
| 6,378,855 B1 | 4/2002 | Sawdon et al. | 269/32 |
| 6,439,560 B2 * | 8/2002 | Sawada et al. | 269/32 |
| 6,573,522 B2 | 6/2003 | Elliott et al. | |
| 6,648,316 B1 * | 11/2003 | Vouland | 269/24 |
| 6,687,971 B2 * | 2/2004 | Nakamura | 29/430 |
| 6,698,736 B2 * | 3/2004 | Dugas et al. | 269/32 |
| 6,786,478 B2 * | 9/2004 | Pavlik et al. | 269/49 |
| 6,913,254 B2 * | 7/2005 | Pavlik et al. | 269/49 |
| 6,944,927 B2 * | 9/2005 | Nakamura | 29/407.01 |
| 2004/0070130 A1 * | 4/2004 | Pavlik et al. | 269/32 |
| 2004/0217529 A1 * | 11/2004 | Pavlik et al. | 269/49 |

FOREIGN PATENT DOCUMENTS

| | | | |
|---|---|---|---|
| EP | 1228952 A2 * | 8/2002 | |
| EP | 1747980 A2 * | 1/2007 | |
| JP | 2-745841 A | 10/1992 | |
| JP | 05038658 A * | 2/1993 | |
| JP | 05162669 A * | 6/1993 | |
| JP | 09295248 A * | 11/1997 | |
| JP | 2001-162469 A | 6/2001 | |
| JP | 2001162469 A * | 6/2001 | |
| JP | 2002-225759 A | 8/2002 | |
| JP | 2002225759 A * | 8/2002 | |
| JP | 2002337770 A * | 11/2002 | |
| JP | 2004-299052 A | 10/2004 | |
| JP | 2004345083 A * | 12/2004 | |
| JP | 2005014208 A * | 1/2005 | |
| JP | 2005279861 A * | 10/2005 | |
| JP | 2006290011 A * | 10/2006 | |

* cited by examiner

LOCATING UNIT FOR WORK HAVING A LOCATING BORE AND AN EMBOSSED PORTION FORMED ABOUT THE LOCATING BORE

The present application is a divisional of U.S. application Ser. No. 10/014,549, filed Dec. 14, 2001, the entire contents of which are incorporated herein by reference.

BACKGROUND OF THE INVENTION

The present invention relates to vehicle body assembly machines for use in vehicle body assembly lines of automobiles and, more particularly, a general-purpose vehicle body assembly machine and a method thereof specifically suited for positioning and supporting a plurality of panels which form a vehicle body.

In the related art, it has heretofore been a usual practice to utilize a general-purposes vehicle body assembly machine including locating units for positioning a work a preset position in accordance with a vehicle body assembling operation as disclosed in, for example, Japanese Patent No. 2745841.

With such a structure, a transfer truck is mounted with a plurality of locators each of which has an operating freedom in orthogonal three axes in X-, Y- and Z-directions. As shown in FIG. 1, each of the locators includes locating unit 101, which has a locating pin 102 and a clamp arm 103, with the plural locating units being used for positioning and clamping a given panel at the preset position for a subsequent transfer to a next work stage.

As shown in FIG. 1, further, the locating pin 102 of each locating unit 101 is associated with a seating detection means 105, such as a proximity switch, which is mounted in an outside area adjacent to the locating pin 102 via a bracket 106 for detecting whether the locating pin 102 is precisely inserted through a locating bore 104 of the panel W11 and whether the panel W11 is seated on the locating pin 102. Thus, the seating detection means 105 functions to detect the presence of seating or unseating state of the panel W11.

Also, the panel W11 is formed with an embossed portion 108, which is seated on a work seating surface 107 of the locating pin 102, in a concentric relationship with the locating bore 104. With such a configuration, if the embossed portion 108 is correctly seated on the work seating surface 107, the panel is clamped with the clamp arm 103 internally located in the locating pin 102.

SUMMARY OF THE INVENTION

With such a structure in the related art described above, the locator body has an operating freedom in the orthogonal three axes which enable a three-dimensional position of the locating pin 102 to be altered to permit the positioning operation of the panel of another car model. However, since mounting position of the seating detecting means 105 to be mounted adjacent the locating pin 102 is settled at a location depending on the shape of the panel, it is needed for the vehicle body assembly machine to be converted whenever panels of another car model are intended to be assembled, with an adverse affect on a general-purpose property of the assembly machine.

More particularly, in a case where the panel, to be positioned and supported with the locating pin 102, is altered to a panel W12 with a shape shown by a phantom line in FIG. 1, the presence of the seating detection means 105 and the bracket 106 remaining at a remarkably protruded area at the outside of the locating pin 102 causes the seating detection means 105, still remaining at its original location, to interfere with the panel W12. This results in need for the mount position of the seating detection means 105 to be converted whenever the panel W12 with an altered shape is manipulated, with a resultant excessive man-hour necessary for converting an equipment.

Further, when implementing a welding on the panel at an area closer to the aforementioned seating detection means 105 using a spot welding gun gripped by a welding robot, or when setting a traveling locus of the spot welding gun along a path in a close proximity to the seating detection means 105, similarly, there is a fear in that the spot welding gun and the seating detection means 105 mutually interfere with one another. For this reason, it is required for the mounting structure of the seating detection means 105 to be converted whenever the panel of the different shape is manipulated. Alternatively, it is undesirably required for the traveling locus of the spot welding gun, i.e. a teaching data to be modified, causing an impractical result.

On the other hand, a recent trend is to obtain a vehicle body assembly machine having a further simplified structure with a reduced spacing in view of a general-purpose property.

The present invention has been made with the above view in mind and has an object of the present invention to provide a locating unit and a vehicle body assembly machine equipped with the locating unit, with the locating pin and a seating detection mechanism associated therewith having a capability of complying with a large number of kinds of works to allow the whole structure of the locating unit to truly have a general-purpose property.

It is another object of the present invention to provide a method for positioning and supporting a work in a fixed place with a locating unit equipped with a locating pin to be inserted through a locating bore formed in the work to allow a vehicle body assembly machine to have a general-purpose property.

According to a first aspect of the present invention, there is provided a locating unit equipped with a locating pin to be inserted through a locating bore formed in a work for positioning and supporting the work in a fixed place, said locating unit comprising: a locating pin having a root portion formed with a work seating surface; and a work seating detection mechanism mounted at said root portion and detecting the presence of seating of said work on said work seating surface.

With such a structure, the presence of the work seating detection mechanism mounted at the work seating surface of the root portion of the locating pin allows an occupying space to be minimized to provide a capability wherein when the locating pins and the locating bores of the works are normalized to be common to one another irrespective of the different kinds of the works, the work seating detection mechanism can be commonly used for a plurality of works of a large number of different kinds without converting the shapes or mounting structures of the work seating detection mechanism per se and the locating pin.

The work seating detection mechanism may be of any types such as a contact type, a non-contact type, a photoelectric type or an air pressure type, provided that a detector portion is exposed to the work seating surface of the root portion of the locating pin to detect the seating or unseating state of the work relative to the work seating surface in a turned-on or turned-off state.

According to a second aspect of the present invention, there is provided a vehicle body assembly machine for implementing a relative positioning operation among a plurality of panel-shaped works, which form a part of a vehicle body of an automobile, prior to welding and joining the plurality of the works, said vehicle body assembly machine comprising: a plurality of locators independently mounted for respective works and each including a locating unit mainly constructed of a locating pin for positioning and supporting each of said works, said locating unit having a capability of self-isolating movement to provide a function of arbitrarily altering at least a two-dimensional position of said locating unit; wherein said locators individually perform said self-isolating movements between work set positions, wherein said works are set with respect to said respective locators, and a relative-positioning final location, wherein a mutual relative-positioning operation of said works are finally implemented, to individually move said locating units in forward or retracted directions to perform said mutual relative-positioning operation among said works; and each of said locating units includes a locating pin adapted to be inserted through a locating bore formed in each of said work for positioning and supporting said each work, said locating pin having a root portion formed with a work seating surface, and a work seating detection mechanism mounted at said work seating surface for detecting the presence of seating of said each work on said work seating surface.

According to a third aspect of the present invention, there is provided a locating unit equipped with a locating pin to be inserted through a locating bore formed in a work for positioning and supporting the work in a fixed place, said locating unit comprising: locating means having a root portion formed with a work seating surface; and detection means mounted at said work seating surface for detecting the presence of seating of said work on said work seating surface.

According to a fourth aspect of the present invention, there is provided a vehicle body assembly machine for implementing a relative positioning operation among a plurality of panel-shaped works, which form a part of a vehicle body of an automobile, prior to welding and joining the plurality of the work, said vehicle body assembly machine comprising: means for positioning and supporting each of said works and including a plurality of locating units each having a capability of self-isolating movement to provide a function of arbitrarily altering at least a two-dimensional position of said locating unit; wherein said positioning and supporting means perform said self-isolating movements between work set positions, wherein said works are set with respect to said respective locating units, and a relative-positioning final location, wherein a mutual relative-positioning of said works are finally implemented, to individually move said locating unit in forward or retracted directions to perform said mutual relative-positioning operation among said works; and each of said locating units includes a locating pin adapted to be inserted through a locating bore formed in each of said work for positioning and supporting said each work, said locating pin having a root portion formed with a work seating surface, and a work seating detection mechanism mounted at said work seating surface for detecting the presence of seating of said each work on said work seating surface.

According to a fifth aspect of the present invention, there is provided a method for positioning and supporting a work in a fixed place with a locating unit equipped with a locating pin to be inserted through a locating bore formed in the work, said method comprising: preparing a locating pin having a root portion formed with a work seating surface, a work seating detecting mechanism mounted at said work seating surface and a clamp arm operable within said locating pin; positioning and supporting said work on said work seating surface; detecting the presence of seating of said work on said work seating surface with said work seating detection mechanism at said root portion; and clamping said work on said work seating surface with said clamp arm.

According to a sixth aspect of the present invention, there is provided a method for implementing a relative positioning operation among a plurality of panel-shaped works, which form a part of a vehicle body of an automobile, prior to welding and joining the plurality of the works, said method comprising: preparing a plurality of locators independently mounted for respective works and each including a locating unit having a capability of self-isolating movement to provide a function of arbitrarily altering at least a two-dimensional position of said locating unit, said locating unit including a locating pin adapted to be inserted through a locating bore formed in each of said work for positioning and supporting said each work, said locating pin having a root portion formed with a work seating surface, and a work seating detection mechanism mounted at said work seating surface; operating said locators individually to perform said self-isolating movements between work set positions, wherein said works are set with respect to said respective locators, and a relative-positioning final location, wherein a mutual relative-positioning operation of said works are finally implemented to individually move said locating units in forward or retracted directions while performing said mutual relative-positioning operation among said works; detecting the presence of seating of said works on said work seating surface with said work seating detection mechanism; and clamping said works in said relative-positioning final location.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
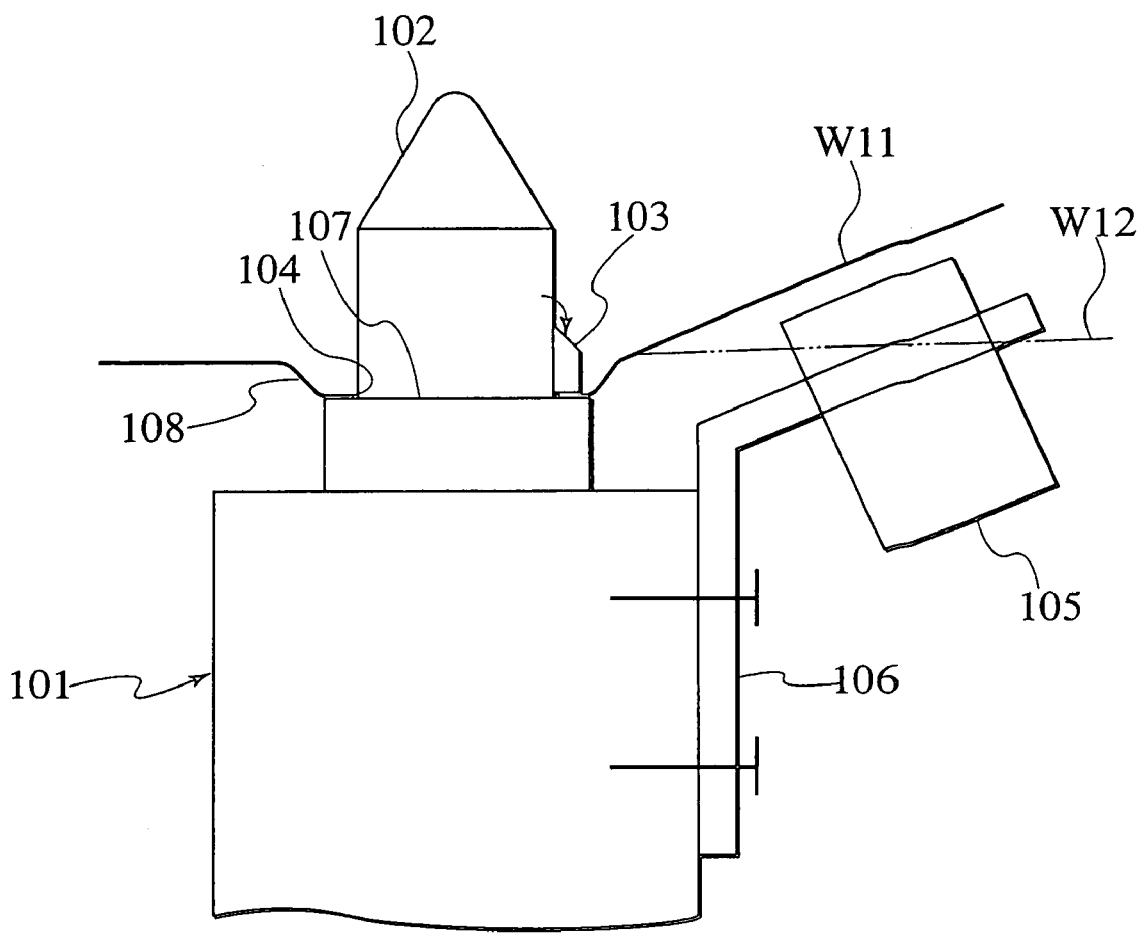
FIG. 1 is a schematic structural view illustrating a locating unit of the related art.
Figure 2:
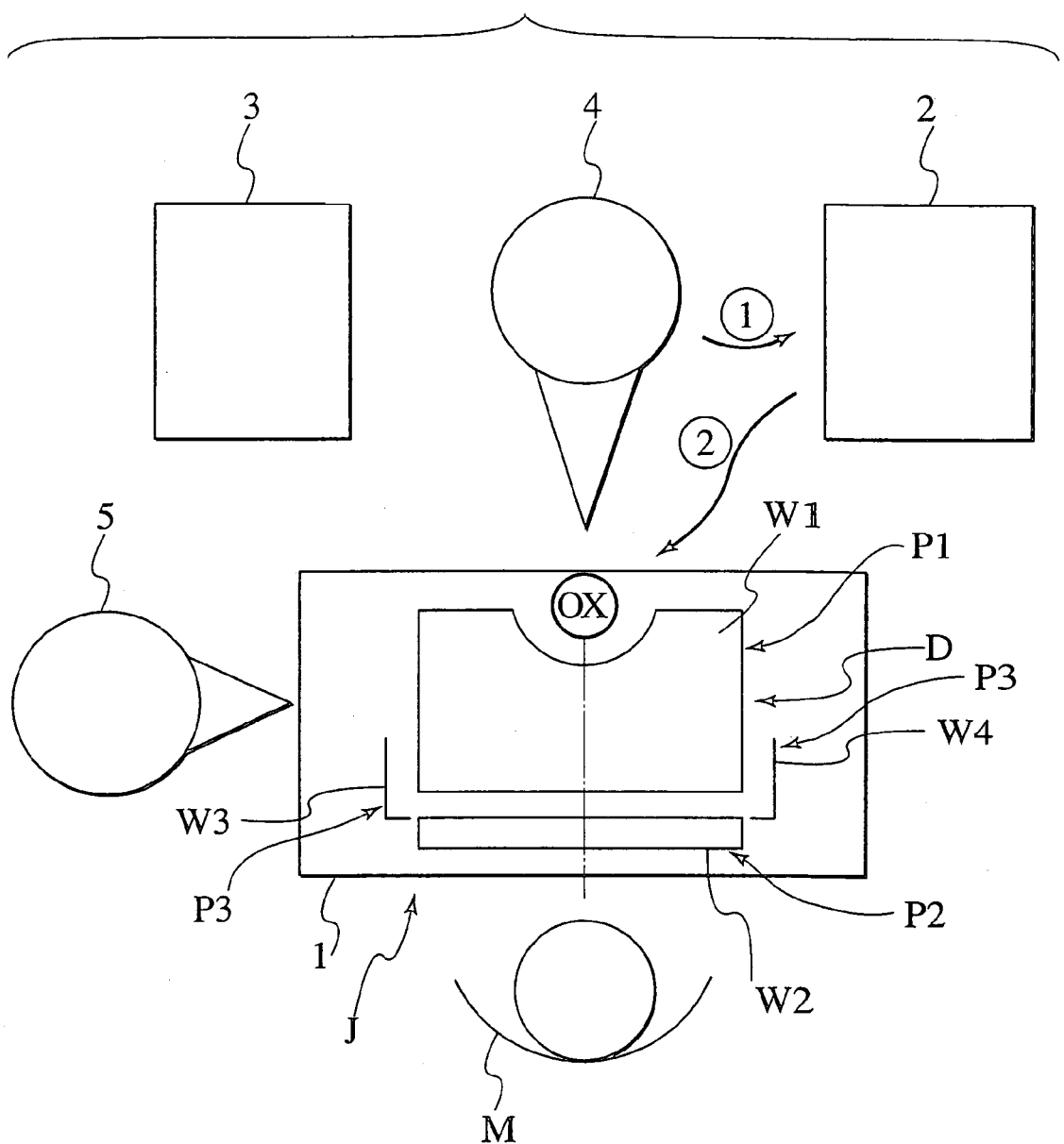
FIG. 2 is a plan view illustrating a schematic structure of a vehicle body assembly machine of a preferred embodiment according to the present invention.

FIG. 2 is schematic plan view of a vehicle body assembly machine, including a locating unit of a preferred embodiment according to the present invention, and shows an example for performing relative positioning among four components parts, involving a dash lower panel (hereinafter referred to simply as a lower panel or panel) W1 which serves as a work, a substantially C-shaped dash upper cross member (hereinafter referred to simply as a cross member or a panel) W2 which also serves as a work and a pair of right and left cowl top side panels (hereinafter referred to simply as side panels or panels, respectively) W3, W4 all of which form a mother body of a dash panel D of an automobile, to obtain a ready state available for welding and joining prior to welding and joining steps of these component parts with respect to one another by spot welding.

Under a condition wherein the dash panel D is assembled as a part into a vehicle body, further, the cross member W2 is located on the lower panel W1 which separates a passenger compartment and an engine compartment from one another, with the side panels W3, W4 being located at both sides of the lower panel W1 and the cross member W2.

The vehicle body assembly machine shown in FIG. 2 is generally comprised of jig base 1 serving as a center of a locator jig J, a first work table 2 in which the lower panels W1 are aligned and stacked, a second work table 3 in which the cross members W2 and the side panels W3, W4 are aligned and stacked, a handling robot of a floor mount type, and a plurality of welding robots 5 (provided only one piece of welding robots being shown in FIG. 2) of tray styles mounted at an upper area of the jig base 1.

With such an arrangement, the lower panel W1 stacked on the first work pedestal is gripped by the handling robot 4 and is placed and positioned at a relative-positioning final location P1 on the jig base 1. Upon a completed positioning step of the lower panel 1, an operator M transfers a set of the cross member W2 and the pair of right and left side panels W3, W4 on the second work table 3 to work set positions P2, P3 on the jig base 1 for carrying out a primary positioning step. Then, when the operator presses a given start switch, a self-isolating movement of the locator jig J allows the lower panel 1 and the cross member W2 and the pair of right and left side panels W3, W4 to be subjected to a mutual relative-positioning operation at the relative-positioning final location P1 to permit the welding robot 5 to perform the spot welding process. Also, depending on car models, it is possible for the cross member W2 or the side panels W3, W4 to be positioned with respect to the jig base 1 with the handling robot 4 commonly used for the lower panel W1.

Figure 3:
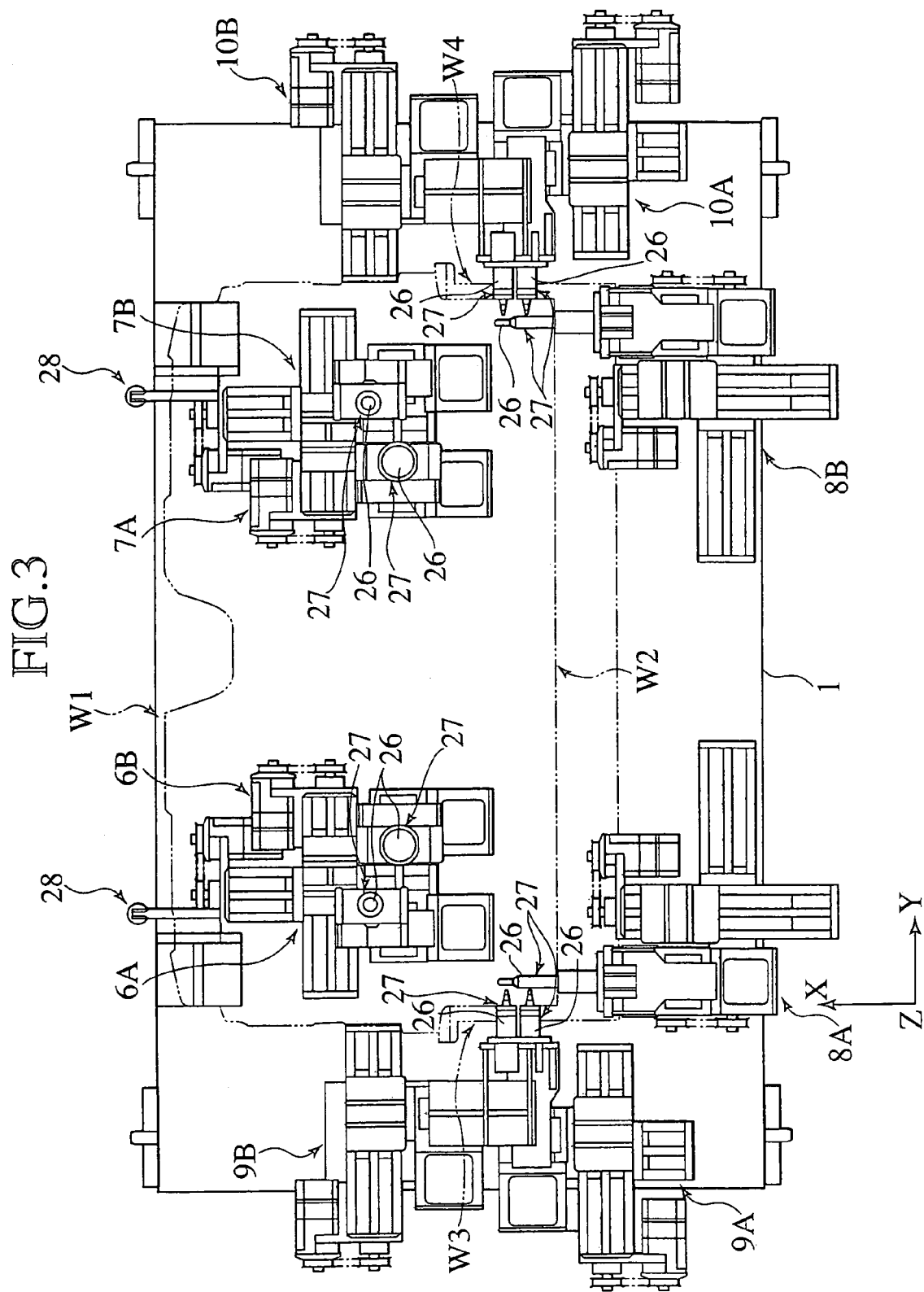
FIG. 3 is a plan view of a locator jig which forms a mother body of the vehicle body assembly machine shown in FIG. 2.
Figure 4:
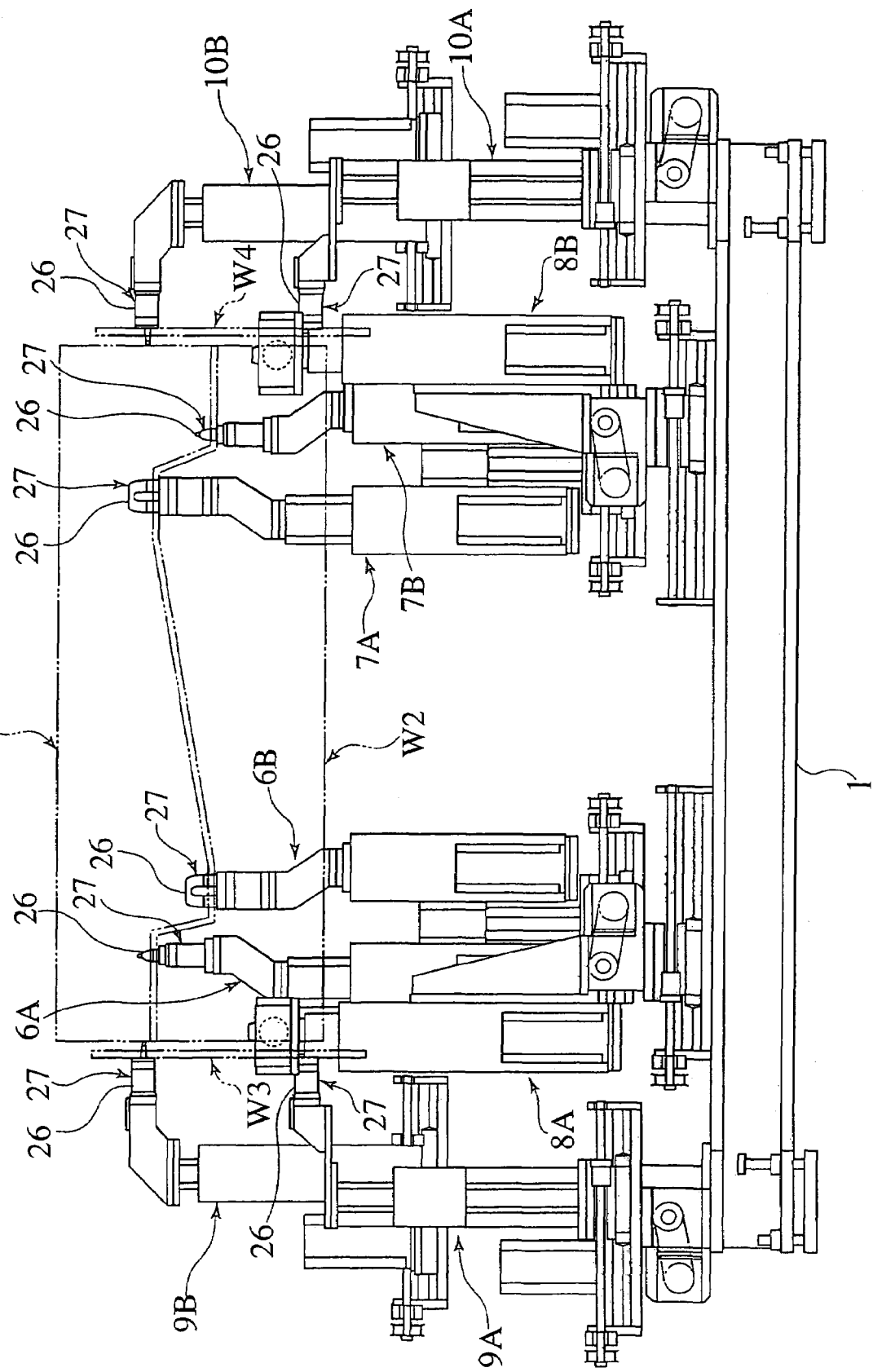
FIG. 4 is a front view of the locator jig sown in FIG. 3.
Figure 5:
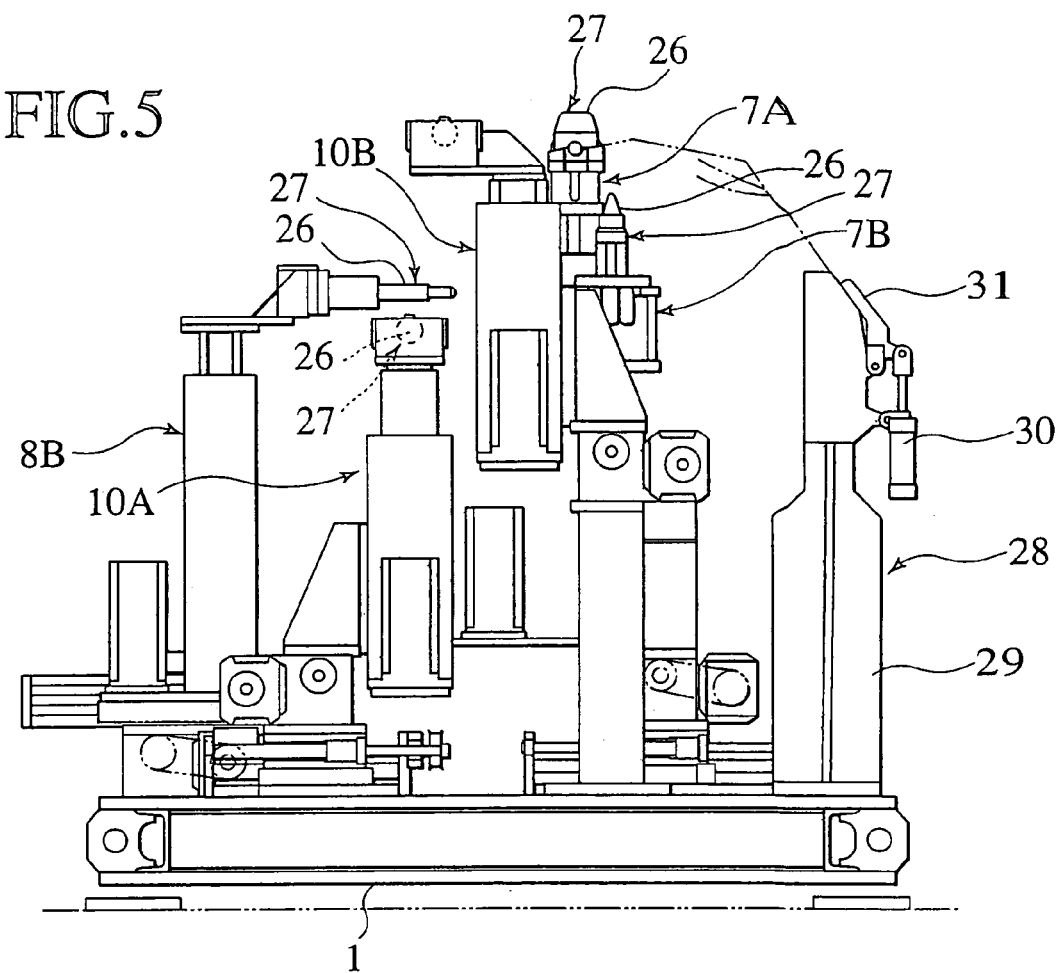
FIG. 5 is a right side view of the locator jig shown in FIG. 3.

FIG. 3 shows a detailed structure of the locator jig J, FIG. 4 is a front view of the locator jig J shown in FIG. 3, and FIG. 5 shows right side view of the structure shown in FIG. 3. The locator jig J includes the jig base 1 which is mounted with left and right locator pairs 6A, 6B and 7A, 7B for positioning the lower panel, a pair of locators 8A, 8B for positioning the cross member, locator pairs 9A, 9B and 10A, 10B for positioning side panels W3, W4. Each of these locators 6A, 6B~10A, 10B is constructed of an X-axis unit, a Y-axis unit and a Z-axis unit of a ball screw type driven by a NC motor, with the Z-axis unit being located at an uppermost area, which form a locator mother unit playing a role as a manipulator with an operating freedom in orthogonal three axes. In the locator mother unit, a distal end of the Z-axis unit is mounted with a locating unit 27 mainly composed of a locating pin 26. Thus, the locator is comprised of the locator mother unit and the locating unit 27. The locators 6A, 6B~10A, 10B are independently operable from one another to enable a self-isolating movement whereby each has a function to arbitrary alter a three-dimensional position of a distal end of each locating unit 27. Further, in the locators 6A, 6B and 7A, 7B for positioning the lower panel, the locating pin 26 of each locating unit 27 is directed upward. On the contrary, in the locators 8A, 8B and 10A, 10B for positioning the cross member and the side panels, the locating pin 26 of each locating unit 27 is transversely directed.

Figure 6:
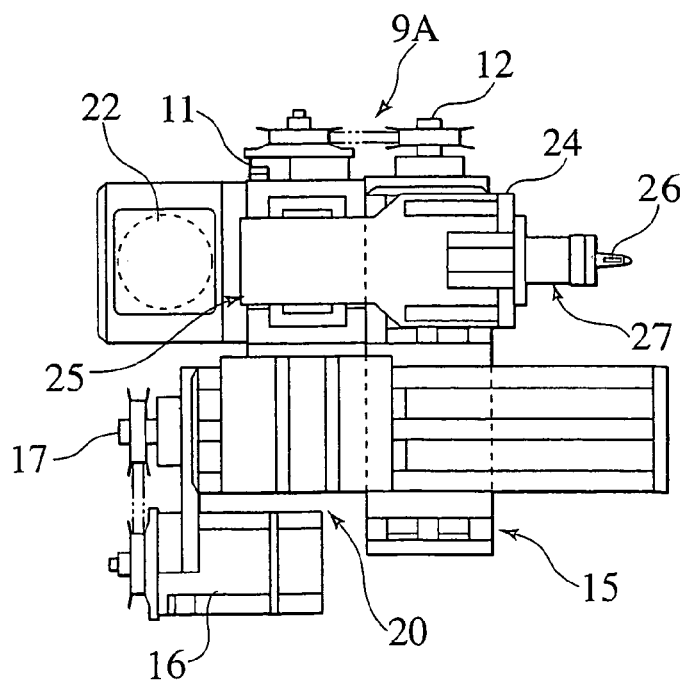
FIG. 6 is a view illustrating a detailed structure of a locator, for positioning a side panel, shown in FIG. 3.
Figure 7:
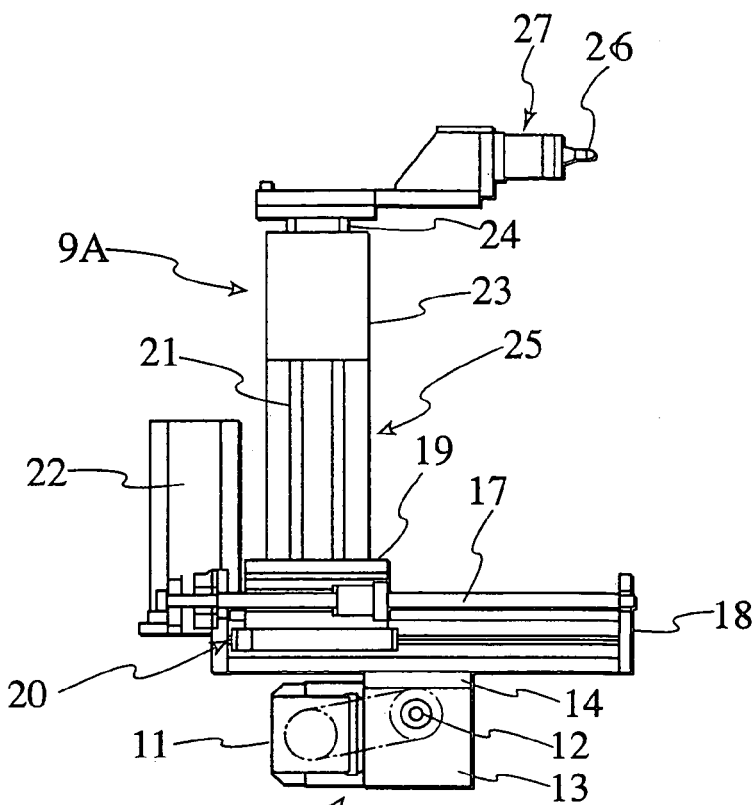
FIG. 7 is a front view of the structure shown in FIG. 6.
Figure 8:
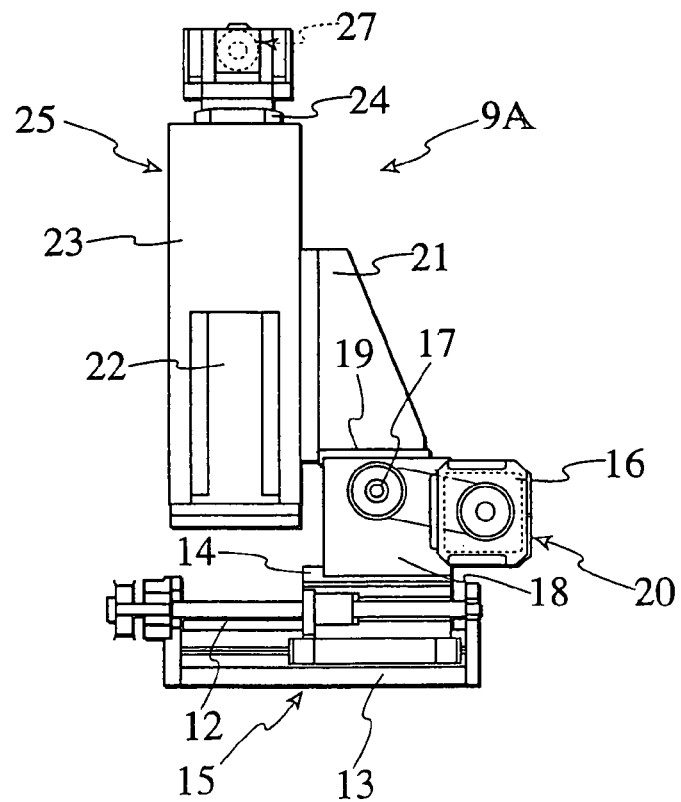
FIG. 8 is a left side view of the structure shown in FIG. 7.

Among the plural locators 6A, 6B~10A, 10B, a typical example of a detailed structure of the locator 9A for positioning the side panel is described below in detail with reference to FIGS. 6 to 8. In FIGS. 6 to 8, the X-axis unit 15 is constructed of an X-axis motor 11, an X-axis base 13 which contains a ball screw 12 driven with the X-axis motor 11, and an X-axis slider 14 mounted on the X-axis base 13 for sliding movement with the ball screw 12. Likewise, the Y-axis unit 20 includes a Y-axis motor 16, a Y-axis base 18 slidably mounted on the X-axis slider 14 which contains a ball screw 17 driven with the Y-axis motor 16, and a Y-axis slider 19 mounted on the Y-axis base 18. Similarly, the Z-axis unit 25 includes a Z-axis motor 22, a Z-axis base 23 connected to the Y-axis slider 19 by means of a flange 21 and containing a ball screw driven with the Z-axis motor 22, and a Z-axis slider 24 mounted on the Z-axis base 23. In addition, an upper distal end of the Z-axis slider 24 is mounted with a transversely extending locating unit 27 mainly composed of the locating pin 26 having a clamping function as will be described below in detail. As will be apparent from the foregoing description, the locator 9A is enabled to alter the three-dimensional position of the locating pin 26 in associated relationship with the X-axis unit 15, the Y-axis unit 20 and the Z-axis unit 25. Also, the other locators basically have the same structures as that of the locator 9A with the locating unit 27 for positioning the side panel.

With the structure mentioned above, when performing the relative-positioning operation of the works using the plural locators, the plural locators are moved in the forward or retracted positions in a synchronized fashion with respect to one another, the vehicle body assembly machine has a more remarkably improved positioning stability in the relative-positioning mode.

As best seen in FIGS. 3 and 5, clamping units 28 are mounted on the jig base 1 at positions adjacent the locator pair 6A, 6B and the locator pair 7A, 7B, respectively, for positioning the lower panel. Each of the clamping units 28 includes a post 29 which stands upright from the jig base 1, and a swing type damper 31 fixedly mounted to an upper distal end of the post 29 and having an air cylinder 30 for driving the damper 31. The lower panel W1, which forms the mother body of the dash panel D, is positioned and supported with the locators 6A, 6B and 7A, 7B and is also simultaneously clamped with the pair of dampers 28, 28.

Figure 9:
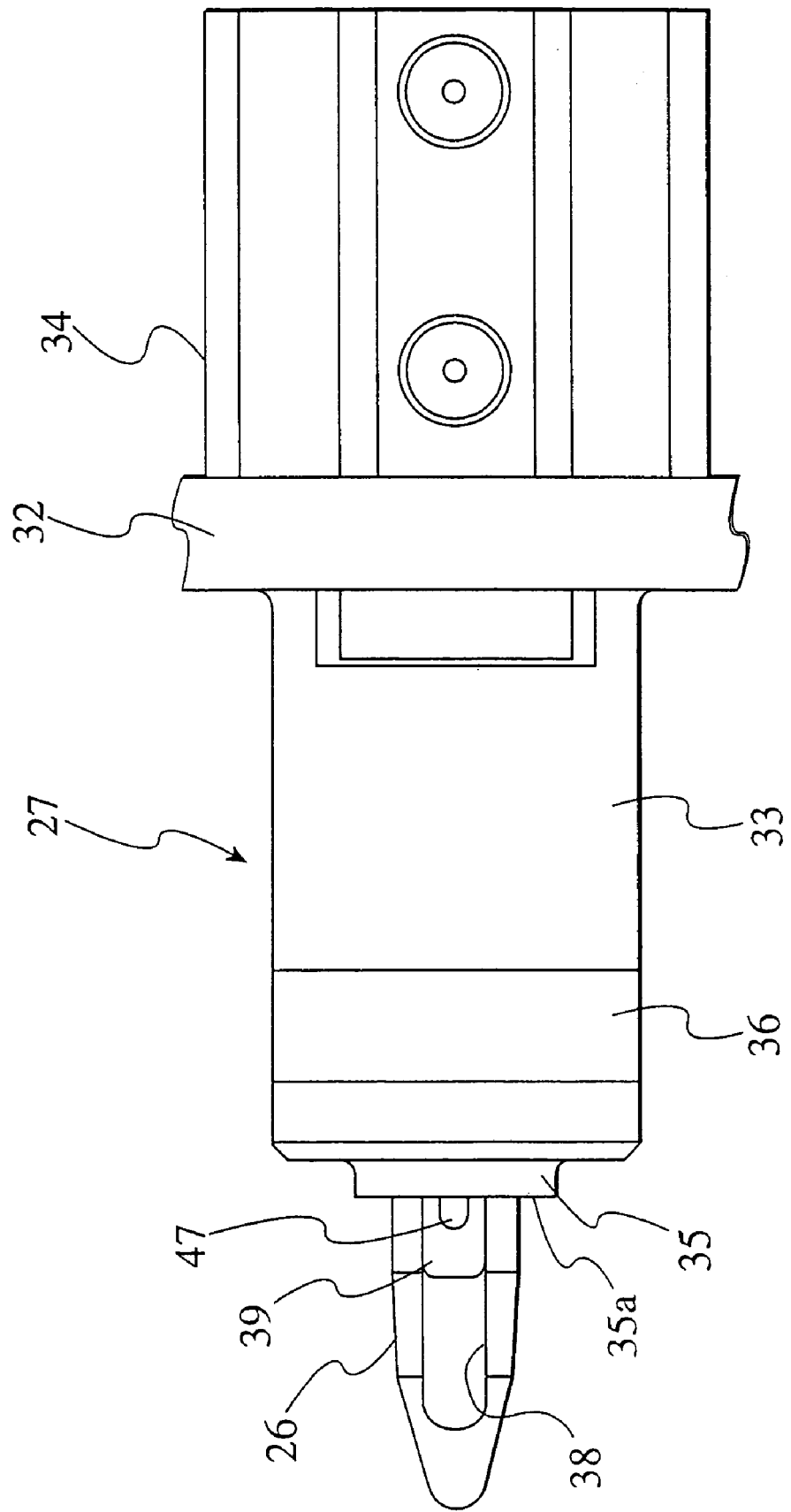
FIG. 9 is an enlarged view of a locating unit to be used in respective locators shown in FIGS. 3 to 5.
Figure 10:
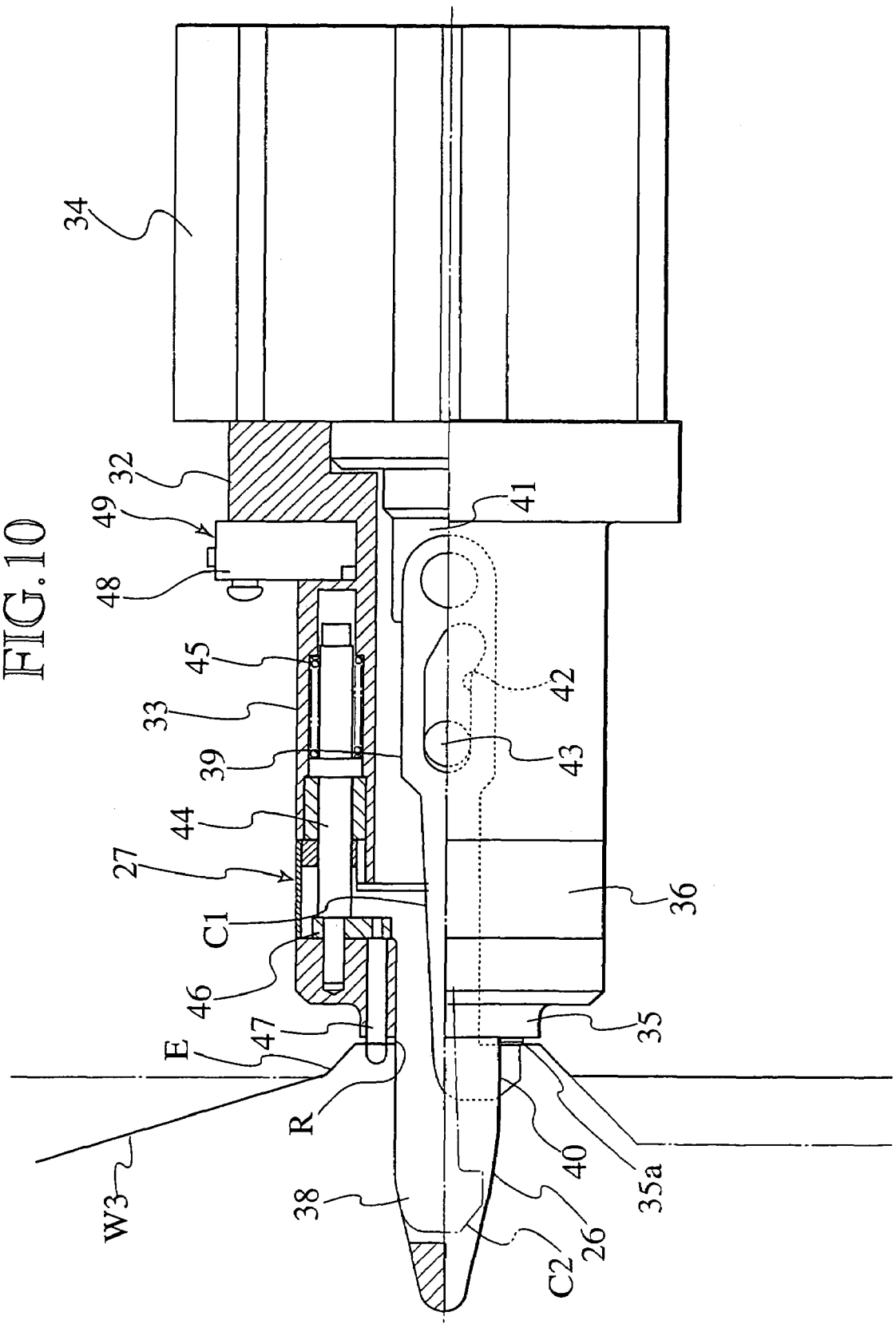
FIG. 10 is an enlarged partial cross sectional view of the locating unit shown in FIG. 9.
Figure 11:
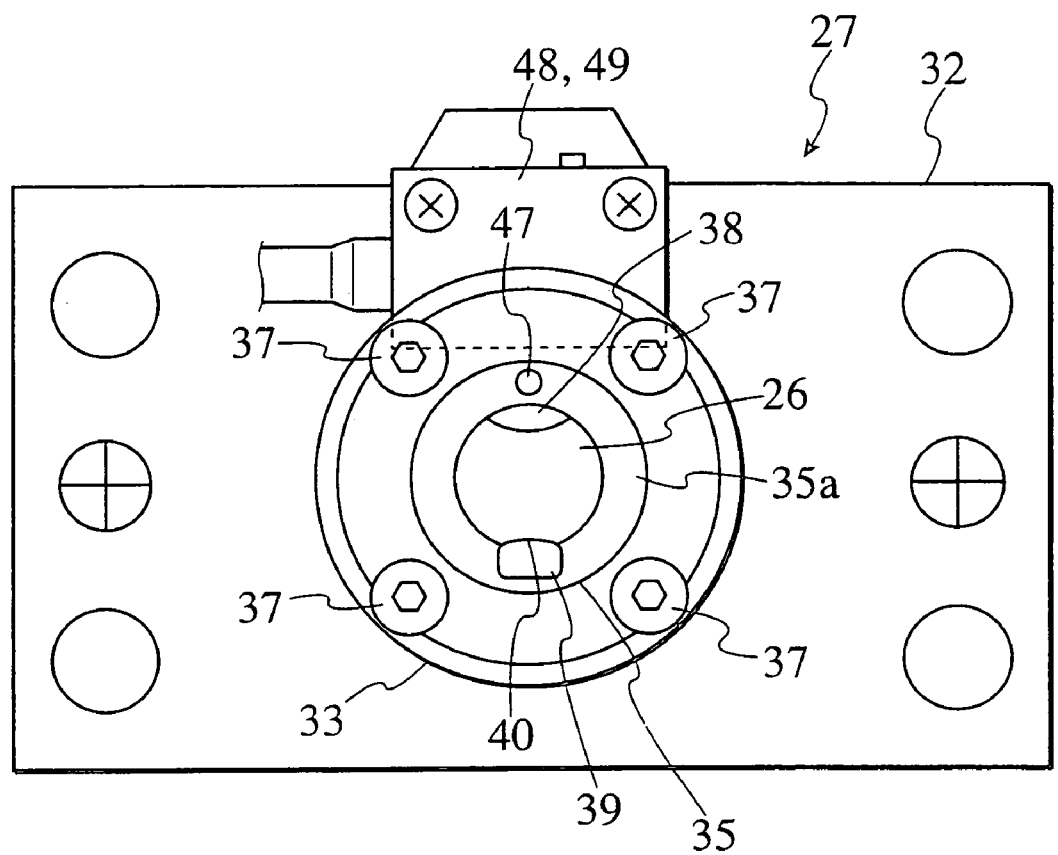
FIG. 11 is a left side view of the locating unit shown in FIG. 10.

FIGS. 9 to 11 show a detailed structure of the locating unit 27 to be mounted to the distal end of each of the locators 6A, 6B~10A, 10B. The locating unit 27 includes a hollow post section 33 having its lower end formed with a mounting flange 32, a clamp cylinder 34 composed of an air cylinder or a hydraulic cylinder formed in a substantially rectangular pole shape and connected to the hollow post section 33 in a concentric relationship, and a tapered locating pin 26 fixedly secured to an upper distal end of the hollow post section 33 via a spacer 36 by means of a plurality of fixture bolts 37 and having a root portion formed with a seating flange section 35 with a work seating surface 35a.

Figure 12:
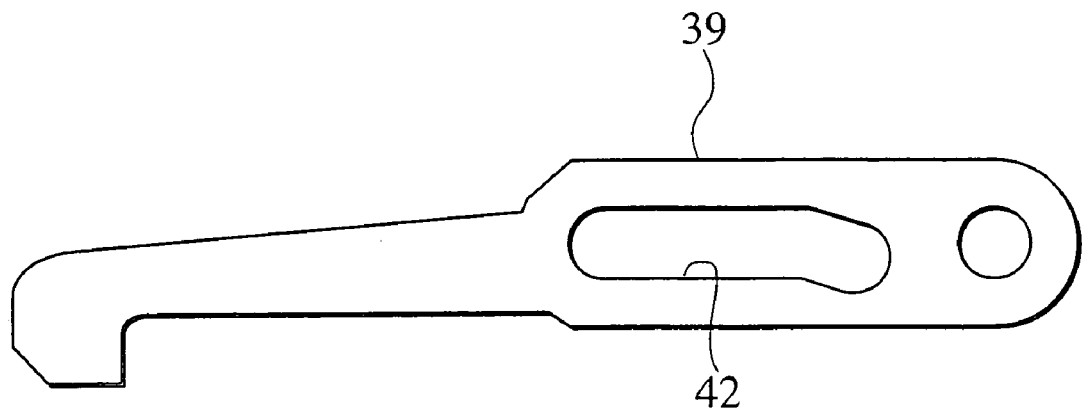
FIG. 12 is an enlarged view of a clamp arm shown in FIG. 10.

As best seen in FIG. 10, the locating pin 26 is axially formed with an elongated slit 38 which penetrates through the locating pin 26 in a radial direction and which communicates with an internal space of the post section 33 to allow a clamp arm 39, formed in a substantially key configuration shown in FIG. 12, to be inserted through the elongated slit 38 and the internal space of the hollow post section 33 as a clamping unit. An upper distal end of the clamp arm 39 protrudes outward from an opening portion 40 formed at the base portion of the locating pin 26, and the other lower end of the clamp arm 39 is coupled to a piston rod 41 of the clamp cylinder 34. In addition, a substantially L-shaped recessed cam 42 is held in engagement with a fixed pin 43 radially and transversely extending from the post section 33. With such an arrangement, when protruding and retracting the piston rod 41 of the clamp cylinder 34, the clamp arm 39 is caused to operate in a clamping and unclamping operation between the clamping position C1 and an unclamping position C2. Especially during the clamping operation, the distal end of the clamp arm 39 and the seating flange 35 are brought into a clamped condition shown in FIG. 10 to clamp a given panel such as the side panel W3 in a fixed place. With such an arrangement, the locating pin 26 collectively incorporates the original positioning and supporting function and the work seating detective function as well as the work clamping function in the mother body, resulting in a further miniaturized structure with a reduced spacing.

On the other hand, the panel W3, which is positioned with the locating pin 26, is formed with a locating bore R and an embossed portion E around a circumferential periphery of the locating bore R to allow the locating pin 26 and the locating bore R to be mutually mated with one another and to concurrently allow the embossed portion E to be seated on the seating flange 35 to effectuate the final positioning of the locating pin 26.

Inside the post section 33 of the locating unit 27, a shaft 44 with stepped diameter portions is located in parallel with a central axis of the locating pin 26 for sliding movement and is urged leftward as shown in FIG. 11 by means of a compression coil spring 45. A small diameter upper end of the shaft 44 is coupled to a coupling plate 46, which laterally extends inward to have an area, offset from the shaft 44, to which a lower distal end of a detection pin 47 is connected and extends in parallel to the shaft 44 to allow an upper end of the detection pin 47 to protrude or retract from the seating flange 35 of the locating pin. Further, in the absence of the panel W3 on the seating flange 35 with the detection pin 47 protruded upward from the seating flange 35, seating the given panel W3 on the seating flange 35 allows the detection pin 47 to retract in the seating flange 35 for thereby wholly retracting the shaft 44.

Further, a work-seating detection mechanism 49 includes a proximity switch 48 which is mounted to the flange 32 of the hollow post section 33 at a location opposed to a bottom end of a large diameter portion of the shaft 44. With such a structure shown in FIG. 10, when the detection pin 47 remains protruded from the seating flange 35 with the bottom end of the large diameter portion of the shaft 44 remaining separated from the proximity switch 48, the proximity switch 48 is turned off. In contrast, the presence of the panel W3 on the seating flange 35 allows the detection pin 47 and the shaft 44 to be displaced in sliding movement such that the proximity switch 48 is turned on. With the provision of the work seating detection mechanism adapted to mechanically detect the presence of the seated condition of the work responsive to the protruding or retracting movements of the detection pin followed by the seating or unseating steps of the work on the work seating surface, it is possible for the locating pin to detect the presence of or absence of the work on the work seating surface in a more precise manner, resulting in a highly improved reliability in detection of the work on the work seating surface.

Thus, the shaft 44, the detection pin 47 and the proximity switch 48 constitute the work-seating detection mechanism 49 which serves as a work-seating detection means for detecting seating or unseating states of the panel W3 with respect to the seating flange 35. Therefore, the sliding displacement of the detection pin 47 and the shaft 44 owing to the seating phase of the panel W3 with respect to the seating flange 35 enables the proximity switch 48 to be turned on or turned off for detection.

In accordance with the vehicle body assembly machine thus constructed, consequently, when supplying the lower panel W1, which is the mother body of the dash panel D as shown in FIG. 2, to the jig base 1 using the handling robot 4, the locating pin 26 of the locating unit 27 is positioned and retained in such a position as to allow the locators 6A, 6B to position the lower panel W1 to the final relative position completed area P1. On the other hand, the locators 8A, 8B for positioning the cross member and the locators 9A, 9B and 10A, 10B for positioning the side panels position and retain the respective locating pin 26 of the relevant locating units at the work set positions P2, P3, respectively.

That is, the locators 8A, 8B for positioning the cross member support and retain the locating pins 26, 26, of the relevant locating units 27, 27, at respective positions retreated from the relative-positioning final location P1 by a given amount in the Y-direction and lowered from the relative-positioning final location P1 by a given amount in the Z-direction. Also, the locators 9A, 9B and 10A, 10B for positioning the side panel support and retain the respective locating pins 26, 26, of the relevant locating units 27, 27 at respective positions retreated from the relative-positioning final location P1 by a given amount in the X-direction and lowered from the relative-positioning final location P1 by a given amount in the Z-direction.

Then, when the lower panel W1 is supplied to and set on the jig base 1 by the handling robot 4, the locating bores R, formed at given locations of the lower panel 1 as seen in FIG. 10, are brought into engagement with the relevant locating pins 26 of the respective locators 6A, 6B and 7A, 7B and, simultaneously, the embossed portions E are brought into the seated condition with respect to the relevant seating flanges 35 of the base portions of the respective locating pins 26. As such, a primary positioning operation is completed for the lower panel W1 in conjunction with the relevant locators 6A, 6B and 7A, 7B for the positioning of the lower panel. When this takes place, also, the clamp units 28, located adjacent the relevant locators 6A, 6B and 7A, 7B for the positioning of the lower panel remain in the unclamped states.

Upon completion of the primary positioning step of the lower panel W1, which forms the mother body of the dash panel D, in a manner described above, the operator manipulates to set the cross member W2 and the pair of left and right side panels W3, W4, which form remaining components parts of the dash panel D, to the relevant locators 9A, 9B and 10A, 10B. In particular, the cross member 2 is set such that the locating bores R preliminarily formed in the cross member W2 are brought into engagement with the relevant locating pins 26 of the respective locators 8A, 8B remaining at the work set position P2 for the positioning of the cross member to allow the relevant embossed portions E around the locating bores R to be seated on the seating flanges 35 of the relevant locating pins 26 as seen in FIG. 10. Also, the pair of side panels W3, W4 are set such that the locating bores R preliminarily formed in the side panels W3, W4 are brought into engagement with the relevant locating pins 26 of the respective locators 8A, 8B remaining at the work set position P3 for the positioning of the side panels to allow the relevant embossed portions E around the locating bores R to be seated on the seating flanges 35 of the relevant locating pins 26 as seen in FIG. 10.

A typical view of a condition wherein the primary positioning operation has been completed in conjunction with the lower panel W1 and the cross member W2 and the pair of left and right side panels W3, W4, which constitute the component elements of the dash panel, in a manner as previously noted is shown in FIG. 2. As seen in FIG. 2, while the lower panel W1 remains in the relative-positioning final location P1, the other remaining cross member W2 and the side panels W3, W4 remain in the respective work set positions P2, P3. As a result, the respective panels W1 to W4 remain in the respective conditions before carrying out the relative positioning operation among the panels and remain in the respective positions separate from one another.

In a consecutive step, when the start switch (not shown) is turned on by the operator M after the setting of the aforementioned panels W1 to W4 has been completed, the clamp arm 39, which is contained in each of the respective locating pins 26 as seen in FIG. 10, is operated for clamping action, clamping the embossed portion E, formed around the locating bore R, between the clamp arm 39 and the seating flange 35. At the same time, the pair of clamp units 28, located adjacent the relevant locators 6A, 6B and 7A, 7B for the positioning of the lower panel operates for the clamping action, thereby clamping the lower panel W1. In such a manner, the final positioning and clamping operations are completed for the panels W1 to W4 with the relevant locators 6A, 6B to 10A, 10B.

This occurs, the work seating detection mechanisms 49, mounted at the respective locating pins 26 as seen in FIG. 10, are actuated, detecting the presence of or absence of the relevant panels W1 to W4 associated with the locators 6A, 6B to 10A, 10B. If, in this instance, the presence of the seating of any panel relevant to the locating pin 26 is not detected by any possibility, a given alarm is produced to urge the operator M to confirm the presence of the panel with respect to the relevant locator.

Figure 13A:
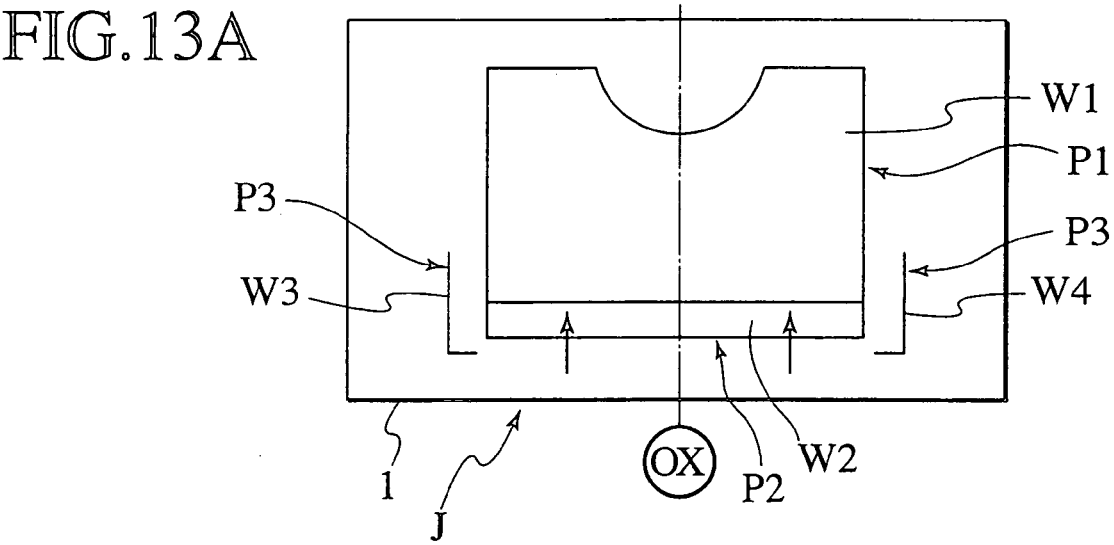
FIGS. 13A to 13C are schematic views illustrating a sequence of assembling panels in the vehicle body assembly machine shown in FIG. 2.

Subsequently, upon confirmation of the presence of all the aforementioned panels W1 to W4, the locating pin 26 moves the cross member W2, which is positioned and retained with the locating pin 26 of the locating unit 27, forward into the relative-positioning final location P1 in the X-direction while raising the locating unit 27, remaining at the upper most end, by a given height in the Z-direction in a mutual synchronism with the pair of locators 8A, 8B for the positioning of the cross member. Thus, the cross member W2 is pressed onto the lower panel W1, which has been already retained at the relative-positioning final location P1 as seen in FIG. 13A, implementing the mutual positioning operation between the lower panel W1 and the cross member W2. When this takes place, the mutual positioning-completed condition between the lower panel W1 and the cross member W2 is self-retained with the relevant locators 6A, 6B, 7A, 7B and 8A, 8B which support the respective panels W1, W2 in their positioned states.

Further, since the locators 8A, 8B for the positioning of the cross member raises the cross member W1 in the Z-direction and then moves the same forward in the X-direction at once, it is possible for the work set position P2 for setting the cross member W2 at the locators for the cross member to be settled at a height lower than the relative-positioning final location P1, with a resultant reduction in load of the operator M with an improved workability. It goes without saying that the height of the work set position P2 may be settled to an arbitrary position depending on a physical body of the operator M.

Figure 13B:
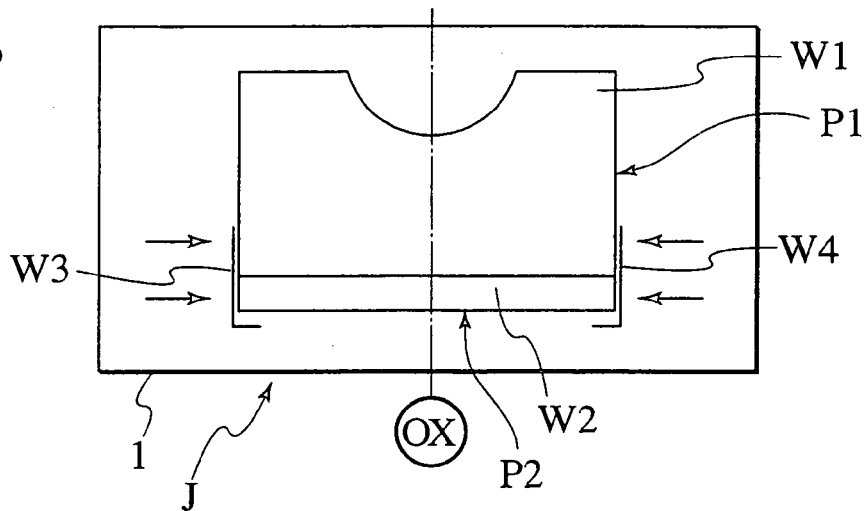

Upon completion of the mutual positioning step between he aforementioned lower panel W1 and the cross member W2, the left and right locator pairs 9A, 9B and 10A, 10B for the positioning of the side panels are actuated to raise the respective locating units 27 by the given amount in the Z-direction in the same manner as previously noted. At the same time, the side panels W3, W4, which are positioned and supported with the relevant locating units 27 and hence the locating pins 26, are moved with the associated locating pins 26 forward to the mutual positioning-completed position P1 in the Y-direction such that the side panels W3, W4 are pressed against the lower panel W1 ad the cross member W2 which have been already located at the mutual positioning-completed position P1 as seen in FIG. 13B to allow the pair of left and right side panels to be mutually positioned in the Y- and Z-directions with respect to the lower panel W1 and the cross member W2 which have already remained in the mutual-positioning-completed condition.

Figure 13C:
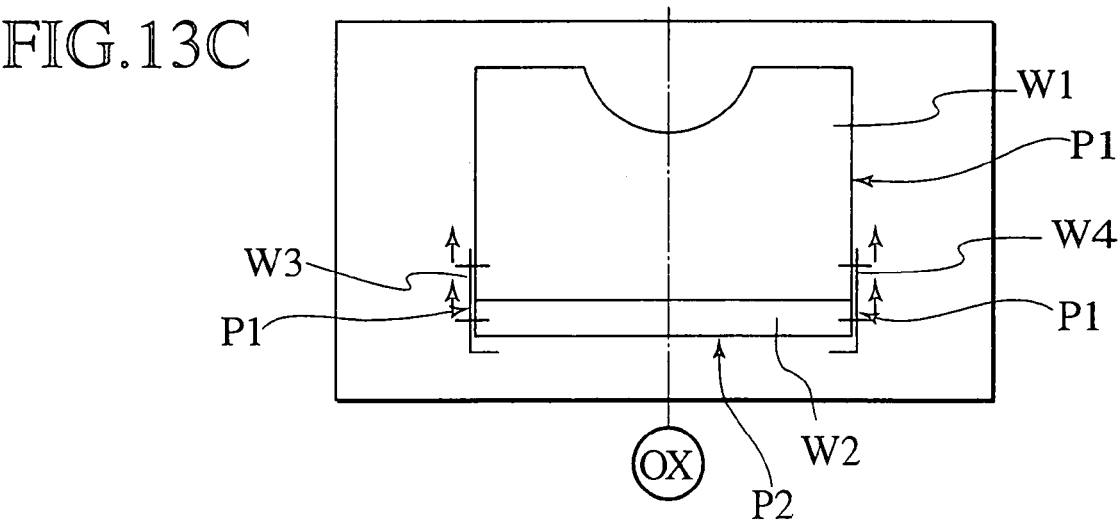

Consecutively, when the mutual positioning operation of the side panels is W3, W4 has been completed with respect to the Y- and Z-directions in the manner described above, the left and right locator pairs 9A, 9B and 10A, 10B move the side panels W3, W4, which are positioned and retained with the respective locating units 27 and, hence, the locating pins 26 forward to the relative-positioning final location P1 in the X-direction in synchronism with the left and right locator pairs 9A, 9B and 10A, 10B for the positioning of the side panels in the same manner as discussed above to allow the side panels W3, W4 to be pressed, in the X-direction, against the lower panel W1 and the cross member W2, which have already remained at the relative-positioning final location P1 as seen in FIG. 13C. Thus, the mutual positioning operation of the pair of left and right side panels is performed in the X-direction with respect to the lower panel W1 and the cross member W2 which remain in the relative-positioning final position.

With such positioning steps mentioned above, the relative-positioning operation is completed in the three-dimensional direction, i.e. X, Y and Z directions among the lower panel W1, the cross member W2 and the side panels W3, W4 which form the component elements of the dash panel, rendering the respective panels W1 to W4 to be mutually held in intimate contact with one another at a proper joining position. Then, a welding command signal is applied to the welding robot 5, shown in FIG. 2, which remains at a stand-by condition, thereby implementing spot welding steps to join the joining parts of the adjoining panels, completing the assembly of the dash panel D, composed of the component elements, involving the aforementioned lower panel W1 and the cross member W2 and the pair of side panels W3, W4.

In the preferred embodiment of the present invention, it is, of course, possible for the three-dimensional positions of the locating units 27 (including the respective locating pins 26) remaining at the distal ends of the respective locators 6A, 6B to 10A, 10B to be arbitrarily altered. In addition, the presence of the original functions of the locating pins 26 of the respective locating units 27 as well as the clamping functions of the clamping means composed of the clamp arms 39 and the associated work seating detection mechanisms 49 contained in the respective locating pins 26 allow the detection pins 47 of the respective clamp arms 39 and the work seating detection mechanisms 49 to effectively operate in the respective regional areas of the seating flange portions 35 of the base portions of the relevant locating pins 26. Thus, there is no fear that excessive parts or portions thereof protrude outside the locating pins 26, respectively, resulting in a miniaturized and simplified structure in each of the locating units 27.

Accordingly, even in a case where an assembly work is performed for a dash panel of a car model different from the dash panel D which has been assembled or in a case where dash panels D of different car models are intended to be assembled in a so-called mixed flow production system, preliminarily normalizing the size of the locating bores R and the size of the embossed portions E among the relevant component elements of the respective dash panels of the different car models enables the locating pins 26 to be commonly used for the vehicle bodies of all car models without the need for any modification in the work-clamping functions and the work seating detecting functions, resulting in an extremely advantageous effect in a general-purpose usage in a vehicle body assembly line.

In accordance with the present invention, since the work seating detection mechanism, which detects the work seated on the work seating surface, is mounted at the work seating surface of the root portion of the locating pin, there is no protruded part of the work seating detection mechanism in the vicinity of a circumferential periphery of the locating pin. Thus, it is possible for only a substantially regional area of the locating pin to display a capacity for the positioning function and the seating state detecting function with only the locating pin. Consequently, preliminarily normalizing the sizes of the locating pin and the locating bore correlated therewith, notwithstanding the works of the different kinds, enables not only the locating pin but also the work seating detecting function to be commonly used for the works of the plurality of kinds. This results in an extremely improved generous-purpose property of the vehicle body assembly machine without the need for converting any component parts or equipment owing to the change of the work that would be otherwise caused in the related art practice.

Another important advantage of the present invention concerns the vehicle body assembly machine mounted with the plurality of locators, each of which is mounted at its upper distal end with the locating unit which has a function of self-isolating movement to enable at least two-dimensional position of the locating unit to be arbitrarily altered. With such a function, the respective locating units are individually moveable in the forward or retracted positions with the aforementioned self-isolating movements using at least the respective operating freedoms in the two-dimensional plane for thereby implementing the relative-positioning operation among the respective works. As a result, there in no need for preparing an additional shifting unit to perform the relative-positioning operation specific for the particular work positioned with and supported by the selected locator separately from the locators, making it possible for providing simplified and miniaturized structure in equipment in a reduced spacing.

A further important advantage of the present invention concerns a capability of readily confirming the presence of or absence of the works relative to the locators using the work seating detective function whereby the vehicle body assembly machine has an improved operating reliability as well as the work detective function. Also, since the work set positions of respective locators are enabled to be arbitrarily altered if desired, the works are set to the locators by presetting the work set positions at respective optimum positions to cope with the operator's physical body, with a resultant favorable efficiency in the workability.

The entire content of Japanese Application No. P2001-22854 with a filing date of Jan. 31, 2001 is herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. A locating unit for a plate type work having a locating bore, and an embossed portion formed about the locating bore, the locating unit comprising:
    a locating pin configured to be inserted into the locating bore;
    a work seating surface configured in a periphery of the locating pin, and to be brought into abutment with the embossed portion; and
    a detector located on the work seating surface configured to detect the embossed portion seated on the work seating surface, for detection of a seating of the plate type work, wherein the detector is a separate element with respect to the locating pin, and wherein the detector comprises a detection pin operative to pass through the work seating surface, for detection of the embossed portion seated on the work seating surface,
    wherein the detection pin is located a distance from the locating pin that is less than a radius of an outer profile of a cross-section of the locating pin, the cross-section being taken in a plane normal to a direction of projection of the locating pin.

2. The locating unit as claimed in claim 1, further comprising a clamp member accommodated in the locating pin and operative to clamp the embossed portion seated on the work seating surface.

3. The locating unit as claimed in claim 1, wherein the detection pin protrudes from the work seating surface in an absence of the embossed portion being on the work seating surface and retracts from the work seating surface in a presence of the embossed portion being on the work seating surface.

4. The locating unit as claimed in claim 1, wherein the locating pin is fixed relative to the work seating surface.

5. A locating unit for a plate type work having a locating bore formed therethrough, the locating unit comprising:
    a locating pin configured to be passed through the locating bore to position the plate type work;
    a work seating surface configured on a root portion of the locating pin, for the plate type work to be seated thereon for the positioning of the plate type work, as the locating pin is passed through the locating bore; and
    a detector provided on the work seating surface, and configured to detect the plate type work seated thereon, wherein the detector is a separate element with respect to the locating pin, and wherein the detector comprises a detection pin operative to pass through the work seating surface, for detection of the plate type work seated on the work seating surfaces,
    wherein the detection pin is located a distance from the locating pin that is less than a radius of an outer profile of a cross-section of the locating pin, the cross-section being taken in a plane normal to a direction of projection of the locating pin.

6. The locating unit as claimed in claim 5, further comprising a clamp member accommodated in the locating pin and operative to clamp the plate type work seated on the work seating surface.

7. The locating unit as claimed in claim 5, wherein
    the detection pin protrudes from the work seating surface in an absence of the plate type work being on the work seating surface and retracts from the work seating surface in a presence of the plate type work being on the work seating surface.

8. The locating unit as claimed in claim 5, wherein the locating pin is fixed relative to the work seating surface.

* * * * *